E. A. HAMMETT & E. H. CLARK.
GRADOMETER.
APPLICATION FILED JUNE 18, 1909.
956,962.
Patented May 3, 1910.
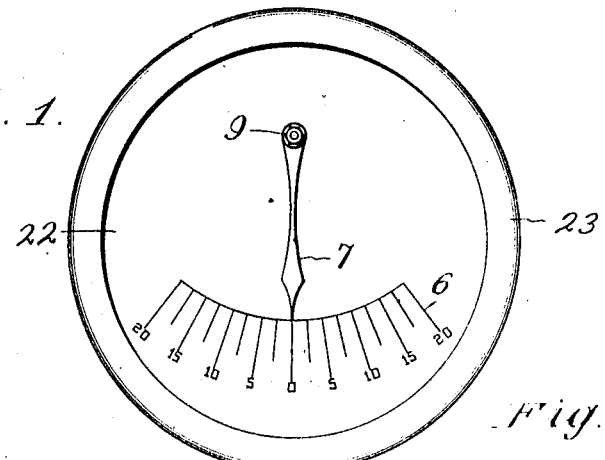
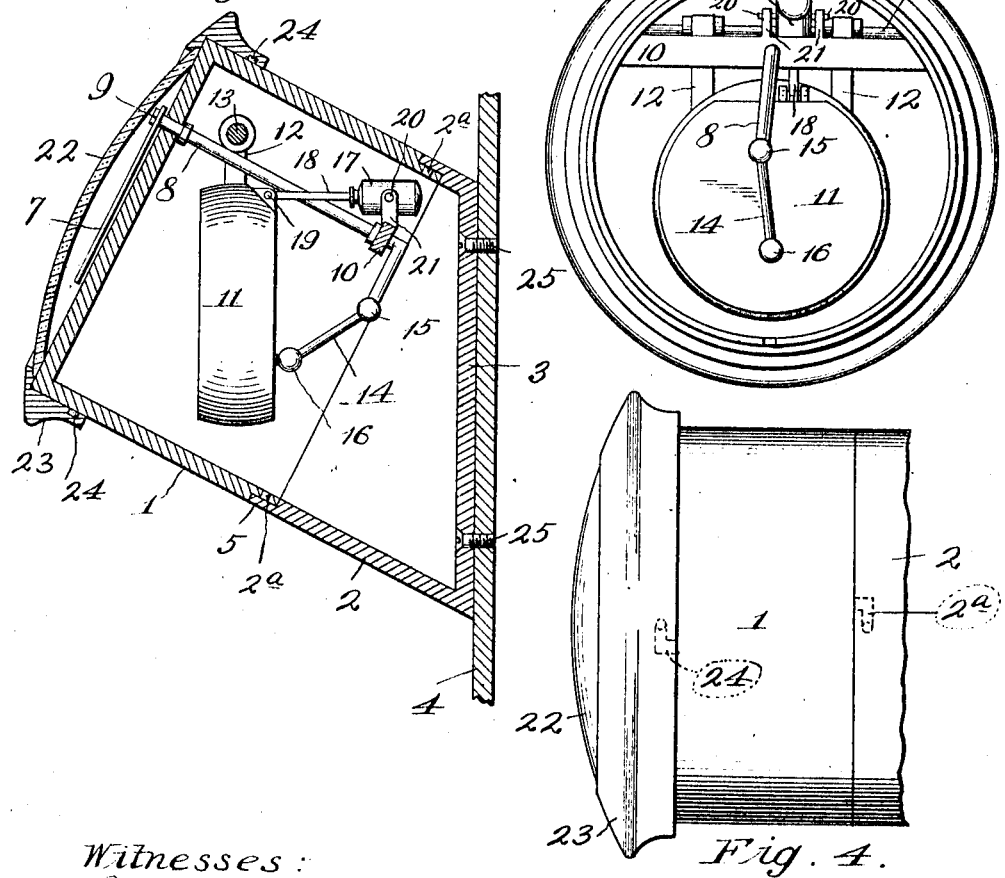
Witnesses:
M. Cox
J. C. Craven
Inventors:
E. A. Hammett and E. H. Clark,
By F. G. Fischer, Atty.

UNITED STATES PATENT OFFICE.

ELBERT A. HAMMETT AND EDWARD H. CLARK, OF KANSAS CITY, MISSOURI.

GRADOMETER.

956,962.

Specification of Letters Patent.

Patented May 3, 1910.

Application filed June 18, 1909. Serial No. 502,942.

*To all whom it may concern:*

Be it known that we, ELBERT A. HAMMETT and EDWARD H. CLARK, citizens of the United States, residing at Kansas City, in the county of Jackson and State of Missouri, have invented certain new and useful Improvements in Gradometers, of which the following is a specification.

This invention relates to improvements in gradometers for automobiles, and one object is to provide a simple inexpensive instrument for accurately indicating the changes in the road over which the automobile is traveling.

The device may also be employed to advantage to indicate the trim of vessels, or it may be used as an ordinary level to indicate changes from a horizontal plane, and in order that the invention may be fully understood, reference will now be made to the accompanying drawing, in which:

Figure 1 represents a front elevation of the instrument. Fig. 2 is a vertical section thereof. Fig. 3 is a rear elevation of the instrument with its rear cap removed. Fig. 4 is a broken plan view.

In carrying out the invention we employ a cylindrical case 1, open at its rear end and provided with a cap 2 for normally closing said rear end. The body of cap 2 extends at an angle to its vertical rear side 3 so that the dial of the instrument will be in convenient position for reading when the rear side of cap 2 is attached to the dash-board 4 of an automobile. Cap 2 is removably connected to the cylinder by means of oppositely-disposed bayonet-joints 2ª, which are covered by an annular flange 5 of the cap. This arrangement conceals the joint and thereby renders it difficult for an unauthorized person to remove the cylinder and the mechanism carried thereby.

The face of the cylinder is graduated as indicated at 6, to form a dial so that changes in grade may be readily ascertained through the means of a pointer 7, which coöperates with the dial. Pointer 7 is adjustably-mounted upon a crank-shaft 8 upon which it may be locked in any desired position by a nut 9 engaging the outer terminal of said shaft. Shaft 8 is rockingly-mounted in the front side of the cylinder and a transverse bearing 10 carried by said cylinder.

11 designates a pendent weight, which through the force of gravity, occupies a vertical position and is provided with a pair of arms 12, freely-mounted upon a transverse shaft 13, so that said shaft may turn therein.

14 designates a connecting-rod secured by universal joints 15 and 16 to the crank end of shaft 8, and the rear end of weight 11, respectively. Vibration of weight 11 incident to the automobile traveling over a rough road, is largely overcome by an air-cushion comprising a cylinder 17 and a piston 18, which latter is pivotally-connected at its forward end by a pin 19 to the upper portion of the weight. Cylinder 17 is pivotally-mounted upon a pair of trunnions 20, extending through a pair of lugs 21 projecting upwardly from bearing 10. By thus pivotally-mounting the cylinder, cramping of the piston therein is obviated.

Pointer 7 is protected by a crystal 22 removably held in position against the face of the cylinder by an annulus 23 secured to the cylinder by oppositely-disposed bayonet-joints 24, the slots of which are concealed by the rear portion of the cap.

In practice the instrument is secured to the dash-board 4 by screws 25 or other suitable means, and the indicator 7 is adjusted to register with zero on the dial so that it may move in either direction to record the changes in grade of the road. When the automobile is descending a grade, the degree thereof from a horizontal plane will be indicated by the pointer swinging to the left, and in ascending a grade, the degree thereof will be indicated by the pointer swinging to the right. The crank-portion of shaft 8 is arranged at such an angle that it will never get in vertical alinement with the connecting-rod 14 and thus lock the weight and shaft 13 from moving freely on their bearings.

Having thus described our invention, what we claim is:—

1. A gradometer, comprising, in combination, a case having a dial, a pointer operative over said dial, a shaft mounted longitudinally of said case and carrying said pointer and having a crank arm disposed at an angle to the vertical plane through the axis of said shaft, a weight suspended to swing longitudinally of said shaft, and means flexibly connecting said crank arm and the lower part of said weight.

2. A gradometer, comprising, in combination, a case having a dial, a pointer operative over said dial, a rotatable shaft carrying said pointer and having a crank arm extending to one side, a weight suspended to oscillate longitudinally of said shaft, and universal joint and shaft connections between the lower part of said weight and the free end of said crank arm.

3. A gradometer, comprising, in combination, a case having a dial, a pointer operative over said dial, a rotatable shaft carrying said pointer and having a crank arm extending to one side, a weight having a point of suspension above said shaft and hanging below said shaft, and a link connecting said crank arm and said weight.

4. A gradometer, comprising, in combination, a cylindrical casing, having a dial at one end, a pointer adapted to traverse said dial, a shaft rotatably mounted in said casing and carrying said pointer, an oscillatory weight suspended to swing longitudinally of said shaft said weight having its points of suspension above said shaft, and having its bulk hanging therebelow, an eccentric element formed on said shaft and a rod connecting said eccentric element and said weight and forming with said eccentric element a toggle lever connection between said weight and said shaft.

In testimony whereof we affix our signatures, in the presence of two witnesses.

ELBERT A. HAMMETT.
EDWARD H. CLARK.

Witnesses:
  F. G. FISCHER,
  M. COX.